United States Patent
Cherkasova et al.

(10) Patent No.: US 8,214,838 B2
(45) Date of Patent: Jul. 3, 2012

(54) SYSTEM AND METHOD FOR ATTRIBUTING TO A CORRESPONDING VIRTUAL MACHINE CPU UTILIZATION OF A NETWORK DRIVER DOMAIN BASED ON WEIGHTED COMMUNICATION

(75) Inventors: Ludmila Cherkasova, Fort Collins, CO (US); Diwaker Gupta, Fort Collins, CO (US); Robert D. Gardner, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1742 days.

(21) Appl. No.: 11/493,492

(22) Filed: Jul. 26, 2006

(65) Prior Publication Data

US 2008/0028398 A1     Jan. 31, 2008

(51) Int. Cl.
 G06F 15/173    (2006.01)
 G06F 9/455     (2006.01)
 G06F 9/44      (2006.01)
(52) U.S. Cl. ............. 718/104; 709/226; 718/1; 719/321
(58) Field of Classification Search .............. 718/1, 104; 719/321; 709/226
 See application file for complete search history.

(56) References Cited

U.S. PATENT DOCUMENTS

| | | | |
|---|---|---|---|
| 5,675,762 A | 10/1997 | Bodin et al. | |
| 6,463,352 B1 | 10/2002 | Tadokoro et al. | |
| 7,779,424 B2 * | 8/2010 | Cherkasova et al. | 719/321 |
| 7,797,707 B2 * | 9/2010 | Cherkasova et al. | 719/310 |
| 7,934,020 B1 * | 4/2011 | Xu et al. | 709/250 |
| 2006/0143617 A1 * | 6/2006 | Knauerhase et al. | 718/104 |
| 2007/0028237 A1 * | 2/2007 | Bulson et al. | 718/1 |

OTHER PUBLICATIONS

Cherkavosa et al. "Measuring CPU Overhead for I/O Processing in the Xen Virtual Machine Monitor" USENIX Association 2005 pp. 387-390.*
Barham, P. et al., "Xen and the Art of Virtualization" In Proc of the ACM Symposium on Operating Systems Principles, Oct. 2003 14 pages.
Fraser, et al., "Reconstructing I/O" Tech Report, UCAM-CL-TR-596 Aug. 2004, pp. 1-16.
Kallahalla, M. et al., "SoftUDC: A Software-Based Data Center for Utility Computing", 2004 IEEE, Published by the IEEE Computer Society, pp. 38/46.
Netperf Home Page [online] Retrieved Jul. 13, 2006 Retrieved from: http://netperf.org/netperf/NetperfPage.html 1 page.
XEN: "The Xen virtual machine monitor" [online] Retrieved Feb. 21, 2005 Retrieved from: http://www.cl.cam.ac.uk/Research/SRG/netos/xen/downloads.hteml 1 page.
U.S. Appl. No. 11/070,674, filed Mar. 2, 2005.

* cited by examiner

*Primary Examiner* — Charles E Anya

(57) ABSTRACT

A method comprises observing communication through a virtualized interface between at least one virtual machine (VM) and a driver domain. Based on the observed communication through the virtualized interface, a weighted amount of communication between the VM and the driver domain is determined for each of the VM(s), wherein the weighted amount is based at least in part on at least one characteristic of the observed communication, such as directional flow and/or size of packets in the communication. Another method comprises evaluating CPU utilization of a target network driver domain in processing communications having different characteristics, and deriving corresponding weighting for the different communication characteristics. The derived weighting for the different communication characteristics are employed within a communication monitor that observes communication between virtual machines and the target network driver domain.

12 Claims, 7 Drawing Sheets

SYSTEM AND METHOD FOR ATTRIBUTING TO A CORRESPONDING VIRTUAL MACHINE CPU UTILIZATION OF A NETWORK DRIVER DOMAIN BASED ON WEIGHTED COMMUNICATION

CROSS-REFERENCE TO RELATED APPLICATIONS

This application is related to co-pending and commonly assigned U.S. patent application Ser. No. 11/070,674, filed Mar. 2, 2005, titled "SYSTEM AND METHOD FOR ATTRIBUTING TO A CORRESPONDING VIRTUAL MACHINE CPU USAGE OF AN ISOLATED DRIVER DOMAIN IN WHICH A SHARED RESOURCE'S DEVICE DRIVER RESIDES", the disclosure of which is hereby incorporated herein by reference. This application is also related to concurrently filed and commonly assigned U.S. patent application Ser. No. 11/493,506, titled "SYSTEM AND METHOD FOR ATTRIBUTING TO A CORRESPONDING VIRTUAL MACHINE CPU UTILIZATION OF A NETWORK DRIVER DOMAIN BASED ON OBSERVED COMMUNICATION THROUGH A VIRTUALIZED INTERFACE", the disclosure of which is hereby incorporated herein by reference.

FIELD OF THE INVENTION

The below description is related generally to monitoring of resource utilization, and more particularly to attributing CPU usage of an isolated network driver domain in which a shared network resource's device driver resides to a corresponding virtual machine that caused such CPU usage by the isolated network driver domain.

DESCRIPTION OF RELATED ART

Traditionally, general-purpose operating systems assume that they have complete control of a system's physical resources. The operating system ("OS") thus assumes responsibility for such system management as allocation of physical resources, communication, and management of external storage, as examples. Virtualization changes this assumption of sole responsibility by a single OS for management of the system. Similar to the way that a general-purpose OS presents the appearance to multiple applications that each has unrestricted access to a set of computing resources, a virtual machine manages a system's physical resources and presents them to one or more OSs, thus creating for each OS the illusion that it has full access to the physical resources that have been made visible to it.

The current trend toward virtualized computing resources and outsourced service delivery has caused interest to surge in Virtual Machine Monitors (VMMs) that enable diverse applications to run in isolated environments on a shared hardware platform. A VMM is a layer of software that runs on a host platform and provides an abstraction of a complete computer system to higher-level software. That is, a VMM, which may also be referred to as a "hypervisor," is a software layer that virtualizes the available resources of a computer and multiplexes them among one or more guest OSs on the computer system. Many such VMMs are available in the art, such as the VMM known as VMware™ available from VMware, Inc. (see http://www.vmware.com). An abstraction created by VMM is called a virtual machine (VM). Accordingly, a VMM aids in subdividing the ample resources of a modern computer and creating the illusion of multiple virtual machines each running a separate OS instance.

Typically, VMMs are classified into two groups: 1) "Type I VMMs" that run directly on physical hardware and thus provide an abstraction that is identical to the hardware underneath the VMM, such as IBM's VM/370; and 2) "Type II VMMs" that run as an application on a host operating system, such as user-mode Linux. Type I and Type II machines are available in the art. For instance, VMWare, Inc. provides both types of VMMs. In a traditional Type I VMM, the exposed virtual hardware functionality is identical to the underlying machine. This "full virtualization" has the main benefit of allowing unmodified OSs to be hosted. However, support for full virtualization was never a part of prevalent IA-32 (e.g., x86) architecture, and the efficient virtualization is difficult, i.e., it can be only achieved at the cost of increased complexity and reduced performance.

Several aspects of virtualization make it difficult or slow for a VMM to provide an interface that is identical to the physical hardware. For instance, some architectures include instructions whose behavior depends on whether the CPU is running in privileged or user mode (sensitive instructions), yet which can execute in user mode without causing a trap to the VMM. Virtualizing these sensitive-but-unprivileged instructions generally requires binary instrumentation, which adds significant complexity and may add significant overhead. For example, VMware's ESX Server dynamically rewrites portions of the hosted machine code to insert traps wherever VMM intervention might be required. In addition, emulating I/O devices at the low-level hardware interface (e.g. memory-mapped I/O) causes execution to switch frequently between the guest OS accessing the device and the VMM code emulating the device. To avoid the overhead associated with emulating a low-level device interface, most VMMs encourage or require the user to run a modified version of the guest OS. For example, the VAX VMM security kernel, VMware Workstation's guest tools add special drivers in the guest OS to accelerate the virtualization of some devices.

A new virtualization technique, called paravirtualization, has been recently introduced, that avoids the drawbacks of full virtualization by presenting a virtual model machine abstraction that is similar but not identical to the underlying hardware. This technique provides improved performance, but it also requires modification to the guest OSs, i.e. the commodity system needs to be ported to a paravirtualized environment. Xen™ is an example of a known VMM for x86 based on the paravirtualization technique, which supports execution of multiple guest OSs and that does not require changes to the application binaries interfaces (ABI), and hence no modifications are required to guest applications. Xen is an open source VMM, and the latest stable release of Xen is version 3.0.1, which is available as of the filing of this application at http://www.cl.cam.ac.uk/Research/SRG/netos/xen/downloads.html. In certain virtualization techniques, device drivers for shared resources are located in a privileged management domain, and thus to access those shared resources the virtual machines communicate with such privileged management domain. Further, in certain virtualization techniques, device drivers for shared resources are located in an isolated driver domain to improve dependability, maintainability, and manageability of the shared resources.

For various reasons, including without limitation management of resource allocation, it is often desirable to monitor the CPU utilization that is attributable to each of the virtual machines (VMs) that may be implemented on a system. Traditional monitoring techniques report the amount of CPU allocated by the scheduler for execution of a particular VM over time. However, this method often fails to reveal the "true" usage of the CPU that is attributable to different VMs. Thus, a desire exists for a system and method for accurately determining CPU utilization that is attributable to VMs on a system.

DETAILED DESCRIPTION

Figure 1:
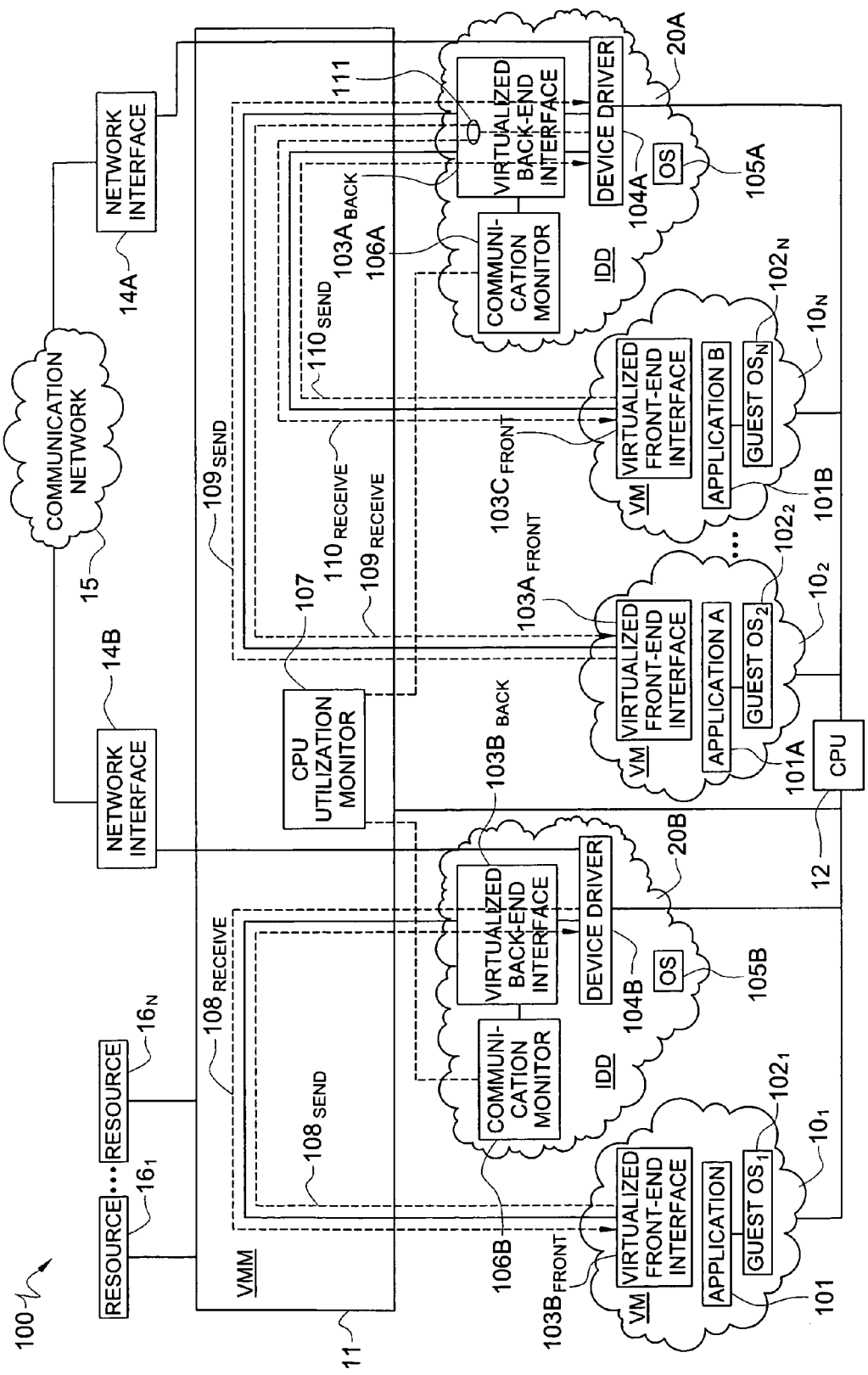
FIG. 1 shows an exemplary system according to an embodiment of the present invention.

As described above, virtualization enables resources to be shared between a plurality of VMs. A VMM is a software layer that virtualizes the available resources of a computer system and multiplexes them among one or more guest OSs on the computer system. As used herein, the term guest operating system refers to one of the OSs that the VMM can host, and the term domain refers to a running virtual machine within which a guest OS executes. Thus, the terms virtual machine (VM) and domain are used interchangeably herein. A privileged management domain refers to a domain that manages the creation and/or termination of other guest domains and may manage other parameters, such as CPU scheduling parameters, resource allocation policies, etc. A driver domain refers to a domain in which a device driver for one or more shared resources resides. An isolated driver domain refers to a domain in which a device driver is placed such that failure of the device driver does not interrupt any other domains in the system. An exemplary implementation of an isolated driver domain is described further herein with FIGS. 6-7. The VMM may be referred to as a hypervisor because it operates at a higher privilege level than the supervisor code of the guest OSs that it hosts. Thus, the terms VMM and hypervisor are used interchangeably herein.

For various reasons, including without limitation management of resource allocation, it is often desirable to monitor the CPU utilization that is attributable to each of the VMs that may be implemented on a system. Traditional monitoring systems typically report the amount of CPU allocated by the scheduler for execution of a particular VM over time. However, this method often fails to reveal the "true" usage of the CPU by different VMs. For instance, in certain virtualization techniques, device drivers for shared resources are located in isolated driver domains, and thus to access those shared resources the VMs communicate with such isolated driver domains. Accordingly, the isolated driver domains use the CPU in processing the access requests received from the VMs. The CPU utilization of the isolated driver domains in servicing the requests of each VM (requesting to access a resource) are not attributed to the corresponding VMs in the traditional technique of monitoring VM CPU utilization (i.e., as those techniques report the amount of CPU allocated to a VM by the scheduler). Thus, the full CPU utilization of the VMs, including the corresponding isolated driver domain CPU utilization, is not determined.

For example, virtualization of input/output (I/O) devices results in an I/O model where the data transfer process involves additional system components, such as an isolated driver domain in which device drivers for the I/O resources reside. Hence, the CPU usage when the isolated driver domain handles the I/O data on behalf of a particular VM should be charged to the corresponding VM. However, simply monitoring the CPU utilization allocated by the scheduler to the corresponding VM fails to account for the CPU utilization of the isolated driver domain in handling the I/O data on behalf of such corresponding VM. Thus, the traditional technique of determining CPU utilization of each VM does not fully capture the CPU utilization attributable to a VM, as it fails to account for the corresponding isolated driver domain CPU utilization that is performed for each VM.

Embodiments of the present invention provide a system and method for monitoring communication through a virtualized interface between VMs and network driver domains (e.g., isolated network driver domains). In general, a network driver domain refers to a domain in which a device driver for accessing a communication network resides. In certain embodiments, such monitored communication may be used for attributing to corresponding VMs CPU utilization of an isolated network driver domain in which a shared communication network's device driver resides. For instance, certain embodiments are provided herein in which a virtualized system has an isolated network driver domain that includes a device driver that enables access to shared network resources (e.g., I/O resources).

Certain techniques for observing communication between a VM and an isolated driver domain and attributing to the VM corresponding CPU usage of the isolated driver domain are described in co-pending and commonly assigned U.S. patent application Ser. No. 11/070,674 filed Mar. 2, 2005 titled "SYSTEM AND METHOD FOR ATTRIBUTING TO A CORRESPONDING VIRTUAL MACHINE CPU USAGE OF AN ISOLATED DRIVER DOMAIN IN WHICH A SHARED RESOURCE'S DEVICE DRIVER RESIDES", the disclosure of which is hereby incorporated herein by reference. Certain embodiments presented therein attribute such CPU usage of an isolated driver domain to a corresponding VM based on a memory page exchange count. While such usage of memory page exchange count may provide a good estimate, it may introduce some inaccuracy due, for example, to the specific memory page exchange procedure employed by the VMM. For instance, often the VMM commercially known as Xen-3™ opportunistically performs additional memory page exchanges in order to keep a sufficient pool of memory pages in an isolated driver domain. Due to Direct Memory Access (DMA), some of the I/O data from a VM can be directly written to memory in an isolated driver domain ("IDD").

Certain embodiments of concurrently filed and commonly assigned U.S. patent application Ser. No. 11/493,506, titled "SYSTEM AND METHOD FOR ATTRIBUTING TO A CORRESPONDING VIRTUAL MACHINE CPU UTILIZATION OF A NETWORK DRIVER DOMAIN BASED ON OBSERVED COMMUNICATION THROUGH A VIRTUALIZED INTERFACE", the disclosure of which is incorporated herein by reference, provide a more accurate technique for observing communication between a VM and a network driver domain (e.g., an isolated network driver domain ("net-IDD")) and attributing to the VM corresponding CPU usage of the network driver domain, by observing the amount of communication flowing through a virtualized interface between such VM and the network driver domain. That is, in U.S. patent application Ser. No. 11/493,506, titled "SYSTEM AND METHOD FOR ATTRIBUTING TO A CORRESPONDING VIRTUAL MACHINE CPU UTILIZATION OF A NETWORK DRIVER DOMAIN BASED ON OBSERVED COMMUNICATION THROUGH A VIRTUALIZED INTERFACE", exemplary systems and methods are disclosed for observing an amount of communication through a virtualized interface between a VM and a network driver domain and determining from such observed amount of communication a corresponding amount of the network driver domain's CPU utilization that is attributable to the VM. Thus, a corresponding amount of a network driver domain's CPU utilization to attribute to a VM may be computed based on an amount of communication (e.g., number of network packets) observed through the virtualized interface between the VM and the network driver domain.

In some instances, however, the amount of CPU utilization of a network driver domain may not correspond equally to the amount of communication between the VM and the network driver domain. Rather, the amount of CPU utilization of the network driver domain may differ depending on certain characteristics of the communication. For instance, in some systems the amount of CPU utilization of the network driver domain may differ for different sized packets. Additionally or alternatively, the amount of CPU utilization of the network driver domain may differ between packets received from a VM directed to the network driver versus packets from the communication network directed to the VM. Thus, as described further herein, embodiments of the present invention determine a "weighted" amount of communication observed through a virtualized interface between a VM and a network driver domain, wherein such weight is determined at least in part on certain characteristics of the observed communication, such as the size of the observed packets and/or the direction of the packets along a communication path. The "weighted" amount of communication observed may then be used for more accurately determining a corresponding amount of CPU utilization by the network driver domain to attribute to the VM.

Accordingly, certain embodiments of the present invention provide further improved accuracy by determining a "weighted" amount of observed communication flowing through a virtualized interface between a VM and the network driver domain, wherein the weighted amount is determined based at least in part on one or more characteristics of the observed communication, such as the size of communication units (e.g., packets) observed and/or the respective direction of the observed communication units along a communication path between the VM and network driver domain. The determined weighted amount of communication between the VM and the network driver domain may be used for accurately attributing to the VM corresponding CPU usage of the network driver domain.

As described further herein, exemplary benchmarking techniques are provided for determining the appropriate weightings to be assigned for a target system based on observed communication characteristics. That is, exemplary techniques are provided for deriving the appropriate relative weights to be assigned for various different characteristics of observed communication. For instance, in one embodiment, a benchmarking application may be employed to evaluate CPU utilization of a target network driver domain under communications of different characteristics in order to derive the corresponding weightings to be assigned for each of the different characteristics.

In certain embodiments of the present invention, the monitored communications are requests from a VM requesting access to shared resources, such as I/O resources. The I/O resources may be communication network resources, disk, etc. Certain embodiments are particularly advantageous for observing communication between a VM and a network driver domain, such as a net-IDD, in performing communication network I/O, and thus the amount of CPU usage by the network driver domain for such communication network I/O that is attributable to the corresponding VM can be determined.

In certain embodiments, the monitored communications flow through a virtualized interface. For instance, in certain embodiments, a virtualized interface for a net-IDD comprises a virtualized front-end interface residing in a VM and a virtualized back-end interface residing in the net-IDD. A communication monitor may be implemented within the virtualized back-end interface for observing communications through such virtualized interface. In a paravirtualized environment, requests for accessing shared resources may be made from the VM to the VMM or to the IDD directly. For example, the guest OSs may be adapted to include a virtual device interface for accessing certain resources via the VMM. In other implementations of virtualization, such as in a fully-virtualized environment, the VM may not make a request to the VMM or the IDD (e.g., the guest OS may not be adapted to communicate with the VMM) but instead the VMM may intercept requests by the VM to access resources and the VMM may forward the requests (e.g., through a virtualized interface) to the appropriate IDD. Such intercepted communications are encompassed by the communications between the VM and IDD described herein, and may be used in certain embodiments for determining the amount of CPU utilization by the IDD that is attributable to the corresponding VM. Thus, certain embodiments of the present invention are applicable for determining the amount of CPU utilization of an IDD that is attributable to each VM implemented on the system, and the embodiments described herein may be employed for any type of virtualization framework, including without limitation full virtualization and paravirtualization frameworks.

In certain implementations, a plurality of VMs (or "domains") may be implemented on a system, and the VMM may multiplex access to shared resources, such as I/O resources, among the VMs. Further, in certain implementations, device drivers for at least some of the shared resources reside in one or more driver domains, and thus the corresponding driver domain is accessed for accessing those shared resources. In certain embodiments, the driver domains are implemented as IDDs, which isolate failure of a given driver from causing a failure of any other domains (other driver domains, guest domains (e.g., VMs), etc.). That is, as described further below, device drivers are often responsible for failures in an OS, and thus, isolating those device drivers in separate domains that are each dedicated to a given device driver may be desirable for isolating failures. Embodiments of the present invention provide a system and method for determining a weighted amount of communication that flows through a virtualized interface between VMs and a network driver domain (e.g., net-IDD), and certain embodiments use such determined weighted amount of communication for attributing CPU utilization of the network driver domain (e.g., net-IDD) in which the network device drivers reside to the appropriate VMs (e.g., attribute the network driver domain's CPU utilization to the corresponding VMs that caused the network driver domain's CPU utilization). More specifically, certain embodiments provided herein monitor communications through a virtualized interface between each of the VMs and the network driver domain in which the network device drivers reside, and, based on an observed amount of communication and observed characteristics of such communication, determine an amount of CPU utilization of the network driver domain that is attributable to each of the VMs. Thus, the appropriate amount of the network driver domain's CPU utilization that is attributable to servicing requests from a given VM is attributed to such given VM. For instance, if the network driver domain utilizes the CPU to process a request from a first VM for accessing a communication network, this CPU utilization of the network driver is attributed to the first VM; and if the network driver domain utilizes the CPU to process a request from a second VM for accessing the communication network, this CPU utilization of the network driver domain is attributed to the second VM.

Further, embodiments of the present invention may be employed for various types of virtualization architectures. Exemplary implementations are described further herein, with reference to FIGS. 6 and 7, in which device drivers that enable access to certain resources (e.g., I/O resources, such as a communication network) are placed in an isolated driver domain. Examples of virtualization architectures in which the device drivers are placed in an IDD include those described by K. Fraser et al. in "Reconstructing I/O", *Tech. Report*, UCAM-CL-TR-596, August 2004. The concepts presented herein may be employed for other virtualization architectures, as well.

In certain embodiments, the amount of CPU utilization that is scheduled for a VM is determined, and the amount of CPU utilization of a network driver domain in which a shared communication network's device driver resides that is attributable to such VM is determined. The scheduled CPU utilization of the VM and the determined CPU utilization of the network driver domain that is attributable to the VM are then summed to compute the total CPU utilization of the VM.

Turning to FIG. 1, an exemplary embodiment of the present invention is shown. As shown, computer system 100 has any number "N" of VMs or "domains" $10_1$, $10_2$, ..., $10_N$ implemented thereon (referred to collectively as VMs 10). Such virtualization may be achieved utilizing any suitable technique now known or later discovered. Within each VM 10, a guest OS is executing, such as guest $OS_1$ $102_1$ in VM $10_1$, guest $OS_2$ $102_2$ in VM $10_2$, and guest $OS_N$ $102_N$ in VM $10_N$. Further, one or more applications may be executing within each VM 10, such as application C 101C in VM $10_1$, application A 101A in VM $10_2$, and application B 101B in VM $10_N$. VMM 11 is implemented, which is a software layer that virtualizes the available resources of computer system 100 and multiplexes them among the various VMs 10 (e.g., the various guest OSs) on the computer system.

System 100 further includes CPU 12, and various shared resources of which VMM 11 manages access by the various VMs 10. The system's shared resources include I/O resources, such as network interfaces 14A and 14B (e.g., any of a variety of different network interface cards (NICs) and/or adapters), which enables system 100 to interface to communication network 15 (which may be a local area network (LAN), the Internet or other Wide Area Network (WAN), an intranet, a wireless network, telephony network, any combination of the aforementioned networks, and/or any other communication network now known or later developed within the networking arts which permits two or more computers to communicate with each other). The shared resources may include any number of other resources $16_1$, ..., $16_N$ to which VMM 11 manages access of the VMs 10, examples of which include without limitation memory (e.g., RAM) and block data storage (e.g., disks).

As described further herein, device drivers for certain ones of the shared resources are placed in driver domains 20 (such as driver domains 20A-20B). In this example, each of the device drivers is arranged in an isolated driver domain 20. More specifically, device driver 104A for supporting access to network interface 14A is arranged in net-IDD 20A, which also includes an OS 105A. Device driver 104B for supporting access to network interface 14B is arranged in net-IDD 20B, which also includes an OS 105B. Other device drivers for supporting access to other system resources, such as resources $16_1$, ..., $16_N$, may likewise be arranged in other IDDs, which are not shown in FIG. 1 for simplicity. Thus, any number "N" of device drivers may be isolated in separate driver domains in this manner, thus resulting in any number "N" of IDDs 20.

The VMs 10 communicate through a virtualized interface to the appropriate network driver domain 20 for accessing a given shared resource (e.g., a shared network device driver), as described further herein. In the example shown in FIG. 1, VM $10_1$ communicates through a virtualized interface with device driver 104B of net-IDD 20B for accessing network interface 14B. Similarly, each of VMs $10_2$ and $10_N$ communicates through a virtualized interface with device driver 104A for accessing network interface 14A. Such virtualized interface may be implemented in any suitable manner. In the example shown in FIG. 1, the virtualized interfaces for supporting communication between the VMs and the net-IDDs comprise a front-end interface and a back-end interface. For instance, in the example shown in FIG. 1, the virtualized interface for supporting communication between VM $10_1$ and device driver 104B of net-IDD 20B comprises a back-end interface $103B_{back}$ implemented in net-IDD 20B and a front-end interface $103B_{front}$ implemented in VM $10_1$. Similarly, in the example shown in FIG. 1, net-IDD 20A implements a back-end interface $103A_{back}$ for supporting communication between VMs $10_2$ and $10_N$ and device driver 104A of net-IDD 20A. VM $10_2$ comprises a front-end interface $103A_{front}$, and VM $10_N$ comprises a front-end interface $103C_{front}$. Exemplary implementations of the virtualized interfaces (e.g., front-end and back-end interfaces) are described further herein. Of course, while VM $10_1$ is shown as accessing network interface 14B via net-IDD 20B by communicating through the virtualized interface comprising front-end virtual interface $103B_{front}$ and back-end virtual interface $103B_{back}$, in other instances VM $10_1$ may access other system resources via their respective IDDs by communicating through the corresponding virtualized interfaces, such as accessing network interface 14A via net-IDD 20A by communicating through the back-end virtual interface $103A_{back}$. Similarly, while VM $10_2$ and VM $10_N$ are shown as accessing network interface 14A via net-IDD 20A by communicating through their respective virtualized interfaces, in other instances VMS $10_2$ and/or $10_N$ may access other system resources via their respective IDDs by communicating through the corresponding virtualized interfaces.

As can be seen in FIG. 1, all communication between a VM and a device driver of an IDD flows through the corresponding virtualized interface. For instance, in the example of FIG. 1, all communication between VMs and net-IDD 20A flows through the back-end virtual interface $103A_{back}$, and all communication between VMS and net-IDD 20B flows through the back-end virtual interface $103B_{back}$. Thus, an accurate measurement of the amount of communication between a VM and a net-IDD can be determined through observing the flow of communication through such virtualized interfaces (e.g., through the net-IDD's respective back-end virtual interface). Thus, in the exemplary embodiment of FIG. 1, a communication monitor 106A is employed for monitoring communication through the virtualized back-end interface $103A_{back}$, and a communication monitor 106B is employed for monitoring communication through virtualized back-end interface $103B_{back}$. Of course, a communication monitor need not be implemented for observing the virtualized interface of every IDD of a system, if not so desired.

Each communication monitor 106A-106B may, for example, count the number of communication units flowing between any VM and the corresponding net-IDD. A communication unit generally refers to a unit of data that is employed for communication between a VM and a given IDD. For instance, communication monitor 106A may count the number of network packets flowing through virtualized back-end interface $103A_{back}$ between VM $10_2$ and net-IDD 20A; and communication monitor 106A may likewise count the number of network packets flowing through virtualized back-end interface $103A_{back}$ between VM $10_N$ and net-IDD 20A.

According to embodiments of the present invention, communication monitors 106A and/or 106B detect certain characteristics of the observed communication, and based on the characteristics determine a "weighted" amount of observed communication. That is, the weighting of observed communication between a given VM and net-IDD may be determined based on characteristics of such observed communication, such as the size of the communication units (e.g., network packets) observed and/or the direction of the communication units observed.

As an example of one characteristic on which weighting of the observed communication may be at least partly based, the size of communication units (e.g., network packets) may, in some systems, affect the amount of CPU utilization by the net-IDD's device driver in processing such communication units. For example, suppose VM $10_2$ communicates network packets having size of 100 bytes each, while VM $10_N$ communicates network packets having size of 1500 bytes each; in certain systems, device driver 104A of net-IDD 20A may consume more CPU utilization for processing the larger network packets of VM $10_N$ than for processing the smaller network packets of VM $10_2$. Thus, the weighting assigned by communication monitor 106A to the observed communication units (e.g., packets) may differ depending on the size of the communication units. For instance, a greater weighting may be assigned for the observed larger packets of VM $10_N$ than for the observed smaller packets of VM $10_2$. However, as described further herein, in certain systems the size of the packets may not significantly impact the amount of CPU utilization of device driver 104A, and thus the weighting of the observed communication by communication monitor 106A may not be based on this size characteristic in some systems. An exemplary benchmarking technique is described further below for determining for a target system a weighting, if any, to be used for this size characteristic of observed communication for the system.

As another example of a characteristic on which weighting of the observed communication may be at least partly based, the direction of the observed communication units (e.g., network packets) may, in some systems, affect the amount of CPU utilization by the net-IDD's device driver in processing such communication units. As shown in the example of FIG. 1, communication between a VM and a network driver domain may be bi-directional, wherein certain communication units flow from the VM to the network driver domain (e.g., to be communicated over the communication network 15), while other communication units are received by the network driver domain from the communication network 15 and flow from the network driver domain to the proper VM.

As an example, FIG. 1 shows that communication may flow from VM $10_1$ to device driver 104B of net-IDD 20B along a first direction $108_{send}$ (e.g., a "send" direction) of a communication path between the VM $10_1$ and net-IDD 20B; and communication may flow from device driver 104B of net-IDD 20B to VM $10_1$ along a second direction $108_{receive}$ (e.g., a "receive" direction) of a communication path between the VM $10_1$ and net-IDD 20B. Similarly, FIG. 1 shows that communication may flow from VM $10_2$ to device driver 104A of net-IDD 20A along a first direction $109_{send}$ (e.g., a "send" direction) of a communication path between the VM $10_2$ and net-IDD 20A; and communication may flow from device driver 104A of net-IDD 20A to VM $10_2$ along a second direction $109_{receive}$ (e.g., a "receive" direction) of a communication path between the VM $10_2$ and net-IDD 20A. Likewise, FIG. 1 shows that communication may flow from VM $10_N$ to device driver 104A of net-IDD 20A along a first direction $110_{send}$ (e.g., a "send" direction) of a communication path between the VM $10_N$ and net-IDD 20A; and communication may flow from device driver 104A of net-IDD 20A to VM $10_N$ along a second direction $110_{receive}$ (e.g., a "receive" direction) of a communication path between the VM $10_N$ and net-IDD 20A. In the exemplary system 100 of FIG. 1, virtualized back-end interface $103A_{back}$ includes logic 111 for determining to which of VMs $10_2$ and $10_N$ communication from device driver 104A is to be directed, and directs the communication to the appropriate VM for which the communication is intended. Thus, by monitoring virtualized back-end interface $103A_{back}$, communication monitor 106A can observe all communication flowing between each of the VMs $10_2$ and $10_N$ and net-IDD 20A along both the send and the receive directional paths.

Generally, CPU utilization of network device driver 104A will differ in its processing of communication along a send path (i.e., communication received by device driver 104A from a VM to be sent out over network 15) versus its processing of communication along a receive path (i.e., communication received by device driver 104A from network 15 to be sent to a VM). For example, in many systems the network device driver consumes more CPU in processing "send" path than for the "receive" path. According to certain embodiments of the present invention, communication monitor 106A weights the observed communication differently depending at least in part on the directional flow of such communication. An exemplary benchmarking technique is described further below for determining for a target system a weighting, if any, to be used for this directional characteristic of observed communication for the system.

As mentioned above, it is often desirable to measure resource utilization by the VMs 10. Available memory per VM 10 is typically statically allocated during the deployment stage and thus can be directly accounted for. Network and storage bandwidth usage can also be accounted by directly observing the amount of traffic transferred in/out of the particular VM. However, measuring the CPU usage by a particular VM 10 is not a straightforward task. VMM 11 often includes a scheduler that schedules CPU utilization for each of the VMs 10. As described above, however, monitoring the CPU utilization scheduled for each VM 10 often fails to fully account for all CPU utilization that should be attributed to each VM 10 because it fails to account for the CPU utilization of the driver domains 20 in servicing the corresponding resource access requests of each VM 10.

In certain embodiments of the present invention, the determined weighted amount of observed communication through a virtualized interface between a VM and a net-IDD may be used for attributing a corresponding amount of CPU utilization of the net-IDD to the VM. For instance, in the example shown in FIG. 1, a CPU utilization monitor 107 is shown, which receives from communication monitor 106A and/or 106B the determined weighted amount of communication flowing through virtualized back-end interfaces $103A_{back}$ and/or $103B_{back}$ for each of the VMs 10, and CPU utilization monitor 107 determines based on such weighted amount of communication an amount of CPU utilization of net-IDDs 20A and/or 20B to be attributed to each of the VMs 10. For example, CPU utilization monitor 107 may receive from communication monitor 106A a value corresponding to a weighted amount of communication (e.g., number network packets weighted based on their respective characteristics, such as size and/or directional flow) communicated through virtualized back-end interface $103A_{back}$ between VM $10_2$ and net-IDD 20A, and CPU utilization monitor 107 may also receive a value corresponding to a weighted amount of communication (e.g., number network packets weighted based on their respective characteristics, such as size and/or directional flow) communicated through virtualized back-end interface $103A_{back}$ between VM $10_N$ and net-IDD 20A. Based at least in part on the respective values received for each of VM $10_2$ and $10_N$, CPU utilization monitor 107 may determine a corresponding amount of CPU utilization by the net-IDD 20A that is attributable to each of such VMs $10_2$ and $10_N$.

Communication monitors 106A and/or 106B and CPU utilization monitor 107 may be software programs stored to a computer-readable medium (e.g., memory, hard disk, optical disc, magnetic disk, or any other data storage device now known or later developed) and executing on a processor-based device, such as a personal computer (PC), laptop computer, server computer, etc. Of course, the functionality of the communication monitors and/or CPU utilization monitor may be implemented in software, hardware, firmware, or any combination thereof. Thus, the communication monitors and/or CPU utilization monitor may be employed as any type of evaluation logic, whether software, hardware, firmware, or any combination thereof.

As described above, VMM 11 is generally a software layer that is commonly implemented in virtualization architectures, which virtualizes the available resources of computer system 100 and multiplexes them among the various VMs 10. Thus, to access certain resources, the VMs 10 communicate with the VMM 11 (e.g., either directly, as in a paravirtualized system, or via the VMM intercepting communication of the VMs, as in many fully-virtualized systems). In certain embodiments, while communications between may be conducted somewhat directly between a virtualized back-end and front-end interfaces, the VMM 11 may be involved in setting up those connections and helping to provide additional communication means (e.g., special calls between the IDD and VMs). That is, in certain implementations, the system is paravirtualized, in which the guest OS of each VM 10 is adapted in some manner to communicate via VMM with an IDD (e.g., IDD 20A of FIG. 1). For example, each of VM 10 may communicate through the respective virtualized back-end interface of an IDD (e.g., back-end interfaces $103A_{back}$ and/or $103B_{back}$ of FIG. 1). A more specific example of a paravirtualized system is described below with FIGS. 6-7. In other implementations, the guest OSs may not be so adapted, but instead the VMM 11 may act to intercept certain resource accesses attempted by the guest OSs, wherein the intercepted accesses are directed by the VMM 11 through the appropriate virtualized interface of an IDD; in which case, embodiments of the present invention may be employed to monitor the intercepted communications flowing through the virtualized interfaces just as the communications from a paravirtualized guest OS and the IDD may be monitored.

Figure 2:
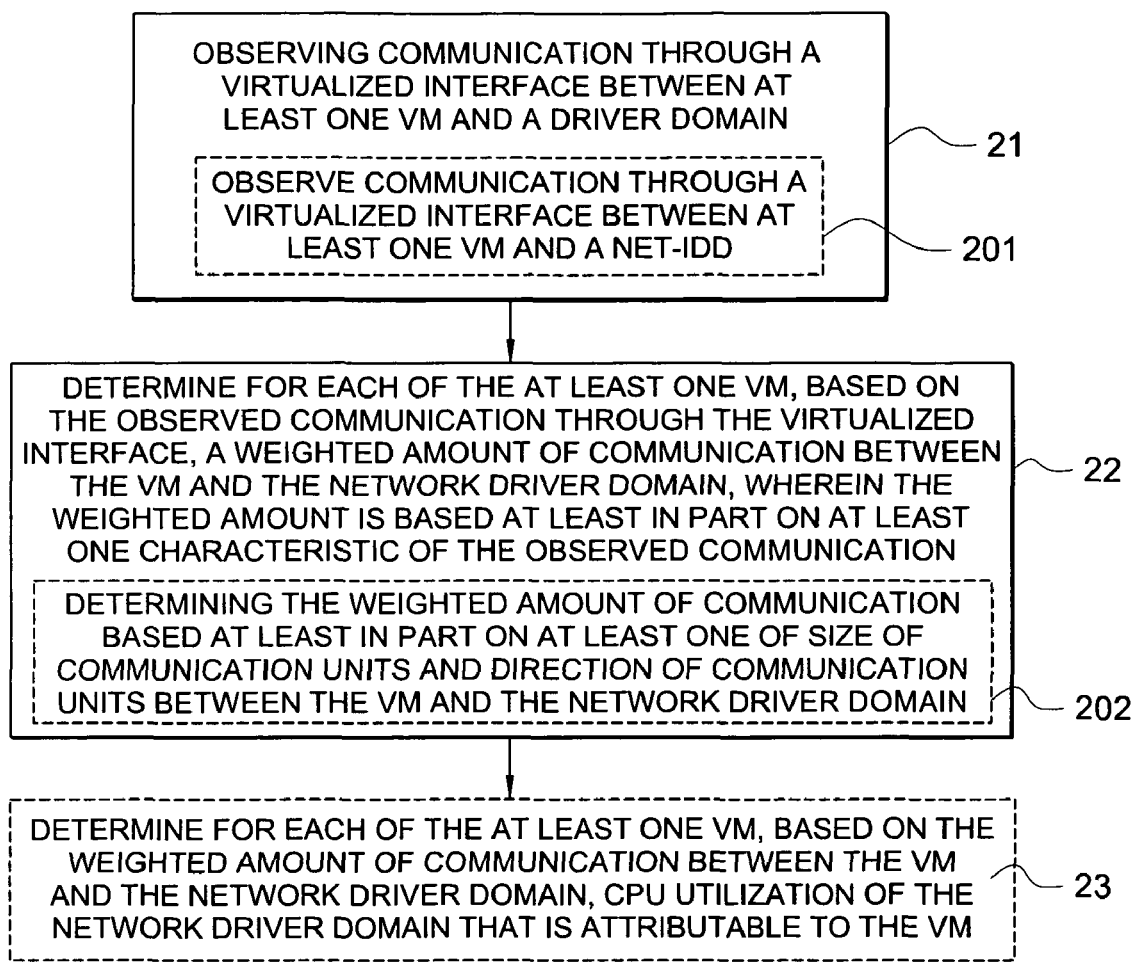
FIG. 2 shows an exemplary operational flow according to one embodiment of the present invention.

Turning to FIG. 2, an exemplary operational flow according to one embodiment of the present invention is shown. In operational block 21, a communication monitor (e.g., communication monitor 106A of FIG. 1) observes communication through a virtualized interface (e.g., virtualized back-end interface $103A_{back}$ of FIG. 1) between at least one VM (e.g., VM $10_2$ and/or VM $10_N$ of FIG. 1) and a network driver domain. As shown in optional dashed-line block 201, in certain embodiments the network driver domain may be a net-IDD, as illustrated in FIG. 1. As described further herein, in certain embodiments the communication under observation are resource access requests from the VMs 10 to the network driver domain 20 for accessing the shared network resource whose device driver resides in such driver domain 20, such as network I/O requests. In operational block 22, the communication monitor determines for each of the VM(s), based at least on the observed communication through the virtualized interface, a weighted amount of communication between the VM and the network driver domain. The weighted amount is based at least in part on at least one characteristic of the observed communication. As shown in operational block 202, in certain embodiments, the weighted amount is determined based at least in part on at least one of size of communication units (e.g., packet sizes) and direction of communication units observed between the VM and the network driver domain.

As shown in optional dashed-line block 23, in certain embodiments a CPU utilization monitor (e.g., CPU utilization monitor 107 of FIG. 1) may determine for each of the VM(s), based on the determined weighted amount of communication between the VM and the network driver domain, CPU utilization of the network driver domain that is attributable to the VM. Accordingly, by monitoring the communications from each of the VMs $10_2, \ldots, 10_N$ through virtualized back-end interface $103A_{back}$ to the network driver domain 20A, for example, the CPU utilization monitor 107 is capable of attributing the corresponding amount of CPU utilization of the network driver domain 20A for servicing the communications (e.g., access requests) to the appropriate VMs $10_2, \ldots, 10_N$. Thus, in certain embodiments an accurate accounting of the full CPU utilization of each VM 10 is provided by the CPU utilization monitor 107, wherein such accounting includes both the scheduled CPU utilization for each VM 10 and the corresponding amount of CPU utilization by the network driver domain 20 that is attributable to each VM 10. In certain embodiments, such as described further herein, the network driver domains 20 are isolated driver domains (i.e., net-IDDs).

Figure 3:
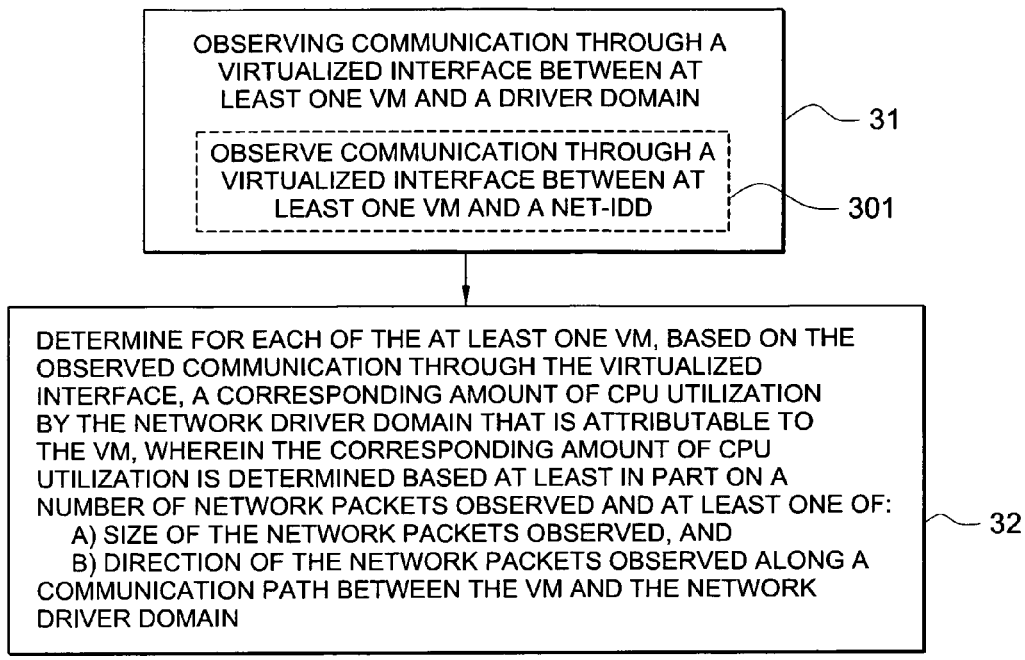
FIG. 3 shows an exemplary operational flow according to another embodiment of the present invention.

FIG. 3 shows an exemplary operational flow according to another embodiment of the present invention. In operational block 31, a communication monitor (e.g., communication monitor 106A of FIG. 1) observes communication through a virtualized interface (e.g., virtualized back-end interface 103A$_{back}$ of FIG. 1) between at least one VM (e.g., VM 10$_2$ and/or VM 10$_N$ of FIG. 1) and a network driver domain. As shown in optional dashed-line block 301, in certain embodiments the network driver domain may be a net-IDD, as illustrated in FIG. 1. In operational block 32, a CPU utilization monitor 107 determines for each of the VM(s), based on the observed communication through the virtualized interface, a corresponding amount of CPU utilization by the network driver domain that is attributable to the VM. In this exemplary embodiment, the corresponding amount of CPU utilization is determined based at least in part on a number of network packets observed as being communicated between the VM and the network driver domain and at least one of: a) size of the network packets observed, and b) direction of the network packets observed along a communication path between the VM and the network driver domain.

Figure 4:
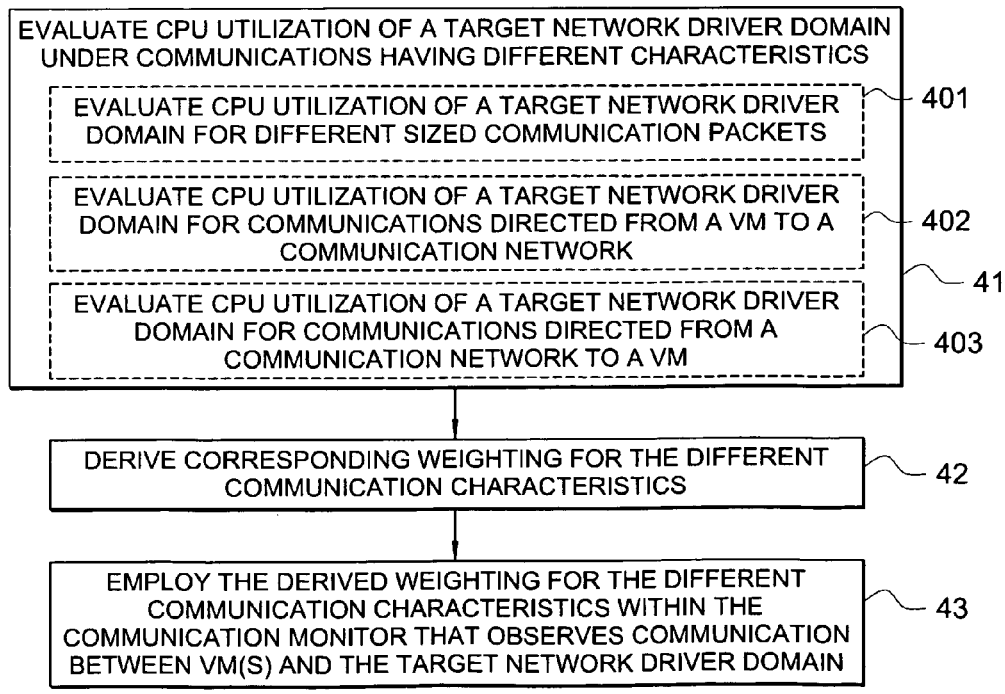
FIG. 4 shows an exemplary operational flow for benchmarking a target system to determine the appropriate weighting of characteristic(s) of observed communication between a VM and a network driver domain according to one embodiment of the present invention.

FIG. 4 shows an exemplary operational flow for benchmarking a target system to determine the appropriate weighting of characteristic(s) of observed communication between a VM and a network driver domain according to one embodiment of the present invention. In operational block 41, a benchmarking application evaluates CPU utilization of a target network driver domain (e.g., network driver domain 20A of FIG. 1) under communications having different characteristics. For instance, in one embodiment, as shown in block 401, the benchmarking application may evaluate CPU utilization of the target network driver domain for each of various differently sized communication packets. Thus, a corresponding impact on CPU utilization relating to the different sizes of communication packets being communicated between a VM and the target network driver domain can be determined. In certain embodiments, as shown in block 402, the benchmarking application may evaluate CPU utilization of a target network driver domain for communications directed from a VM to a communication network (e.g., "send" communications). Similarly, in certain embodiments, as shown in block 403, the benchmarking application may evaluate CPU utilization of a target network driver domain for communications directed from a communication network to a VM (e.g., "receive" communications). Thus, the relative impact on CPU utilization of packets directed along a send path versus packets directed along a receive path between a VM and the target network driver domain can be determined.

In block 42, the benchmarking application derives, based on the above evaluations, corresponding weighting for the different communication characteristics. For instance, corresponding weightings for packets directed along a send path and corresponding weightings for packets directed along a receive path may be derived. Additionally or alternatively, a further weighting may be derived based on the size characteristic of the communication packets.

In operational block 43, the derived weighting for the different communication characteristics may be employed within the communication monitor (e.g., communication monitor 106A of FIG. 1) that observes communication between VM(s) and the target network driver domain (e.g., network driver domain 20A of FIG. 1).

Figure 5:
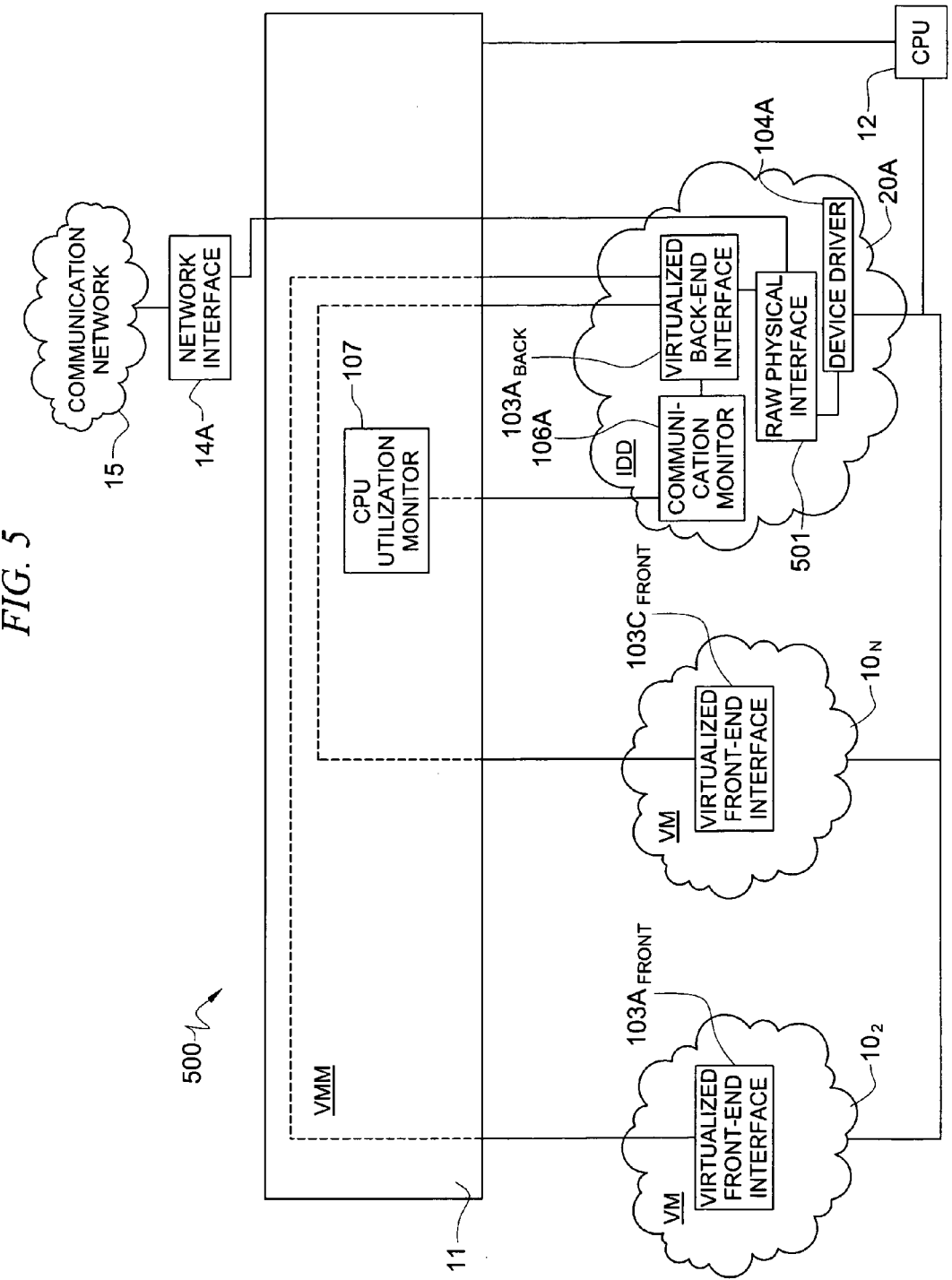
FIG. 5 shows an exemplary system according to one embodiment of the present invention.

FIG. 5 shows an exemplary system 500 according to one embodiment of the present invention. As shown, functions in the back-end virtualized interfaces of IDDs are again provided for virtualizing the available resources of computer system 500 and multiplexing them among the various VMs 10$_2$ and 10$_N$. As with the example of FIG. 1, VMs 10$_2$ and 10$_N$ are each requesting I/O access to network interface 14A via device driver 104A of net-IDD 20A through virtualized back-end interface 103A$_{back}$. As shown in this example, virtualized back-end interface 103A$_{back}$ may serve as an intermediary between VMs 10$_2$ and 10$_N$ and a raw physical interface 501 to the device driver 104A. As virtualized back-end interface 103A$_{back}$ receives communication from one of the VMs directed to device driver 104A, it forwards the communication to the raw physical interface 501 of the device driver 104A. When the virtualized back-end interface 103A$_{back}$ receives return communication from the device driver 104A (e.g., via the raw physical interface 501), the virtualized back-end interface 103A$_{back}$ determines which of the VMs the return communication is intended for and directs such return communication to the intended VM (e.g., to the intended VM's virtualized front-end interface, such as virtualized front-end interface 103A$_{front}$ of VM 10$_2$ or virtualized front-end interface 103C$_{front}$ of VM 10$_N$). Thus, by monitoring the virtualized back-end interface 103A$_{back}$, communication monitor 106A is capable of determining the amount of communication between each of the VMs 10$_2$ and 10$_N$ and device driver 104A, as well as various other characteristics of the communication, such as size of communication units (e.g., packets) and/or directional flow of the communication units. An exemplary embodiment of a virtualized interface that comprises a back-end interface referred to as "netback" and a front-end interface referred to as "netfront is described further below.

Exemplary techniques that may be employed by CPU utilization monitor 107 for determining the CPU utilization of a VM 10, including the amount of CPU utilization by the network driver domain 20 that is attributable to such VM 10, are described further below. As described further below, in certain embodiments, a light-weight monitoring technique is provided for measuring the CPU usage of different VMs 10, including the corresponding CPU overhead of the network driver domain 20 caused by processing (e.g., I/O processing) on behalf of a particular VM 10. This monitoring system can be used, as examples, for assistance in billing and/or for a whole variety of management tasks, such as: a) support of policy-based resource allocation; b) admission control of new VMs; c) support for VMs migration; and d) quality of service ("QoS") provisioning of VMs.

Since the virtual machine technology allows different customers to share and utilize the same machine resources, the performance monitoring system provided herein, which accurately attributes the resource usage to different VMs, may be very important for certain management tasks. As one example, a virtual machine architecture, such as the exemplary Xen™ architecture described further below with FIGS. 6-7, may be used to create isolated virtual clusters out of existing machines in a data center that may be shared across different administrative units in an enterprise. Managing this virtual IT infrastructure and adapting to changing business needs presents a challenging task. In certain implementations of such virtual cluster system, virtual machines (VMs) can be migrated from one physical node to another when the current physical node capacity is insufficient, or for improving the overall performance of the underlying infrastructure. To support these management functions, an accurate monitoring infrastructure for reporting resource usage of different VMs becomes desirable. The CPU utilization monitor described herein may be advantageously employed for use in management of such a system, for example. Of course, embodiments of the CPU utilization monitor described herein may be employed for various types of applications (e.g., billing, resource utilization management, etc.) in any type of virtualized system that may be implemented, and thus is not limited in application to resource allocation management in the above-mentioned virtual cluster system.

Figure 6:
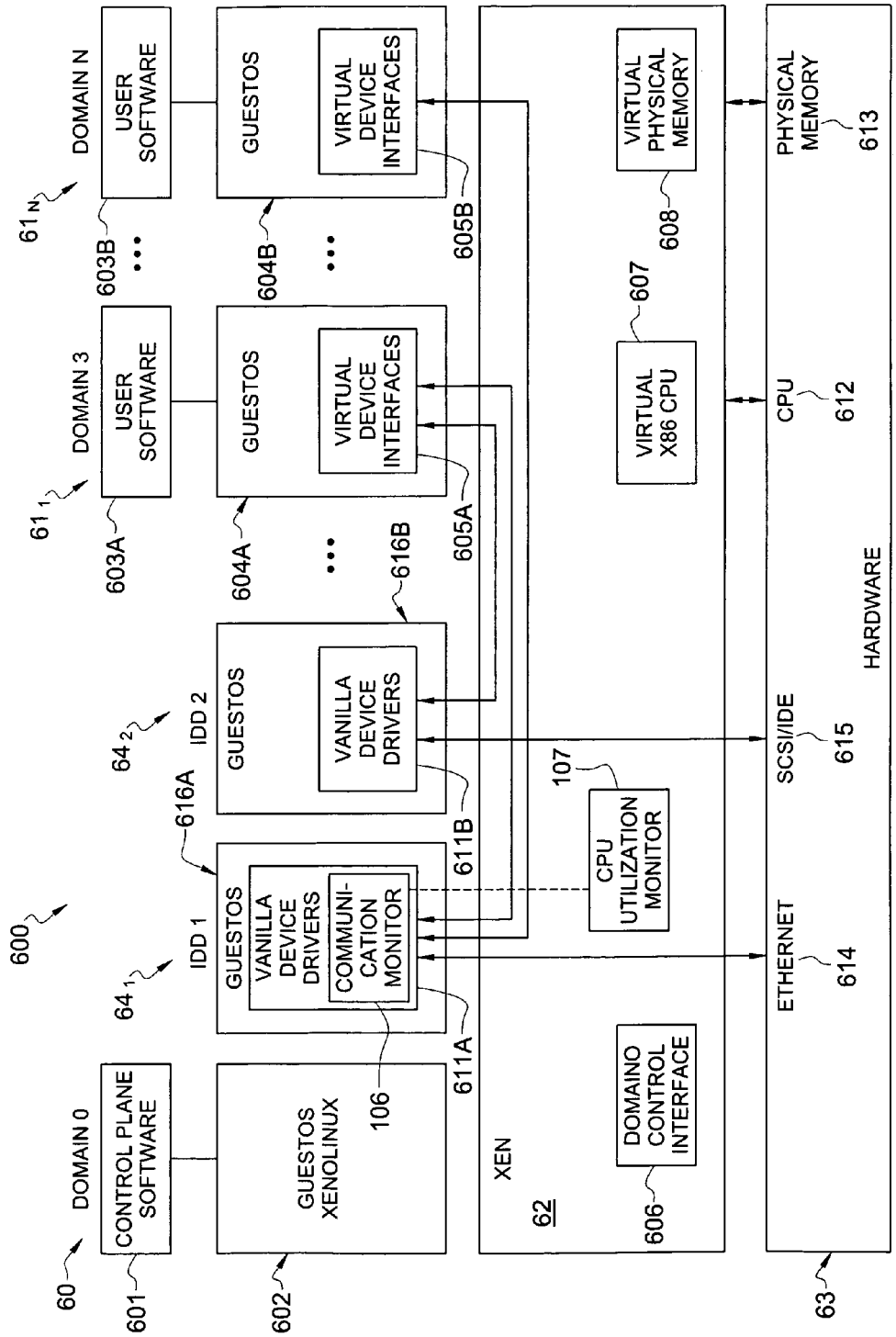
FIG. 6 shows a specific exemplary virtualization architecture implementing an embodiment of the present invention.

Turning now to FIG. 6, an exemplary virtualization architecture implementing a CPU utilization monitor in accordance with one embodiment of the present invention is shown. More specifically, system 600 implements a known VMM architecture corresponding to that of Xen™ (which is referred to herein as Xen-3), which is a VMM developed for the x86 platform. Of course, such known VMM architecture is adapted to include the communication monitoring and CPU utilization monitoring functionality that is operable to attribute CPU utilization of a net-IDD to corresponding VMs, as described further below.

Exemplary system 600 includes a privileged management domain 60, referred to herein as "domain 0" (or "Dom$_0$"), which includes a guest OS (e.g., XenoLinux) 602 and one or more applications executing therein (e.g., control plane software) 601. System 600 further includes any number "N" of VMs or "domains" $61_1, \ldots, 61_N$ implemented thereon (referred to collectively as VMs or domains 61). Within each VM 61, a guest OS is executing, such as guest OS 604A in VM $61_1$ and guest OS 604B in VM $61_N$. Further, one or more applications may be executing within each VM 61, such as application 603A in VM $61_1$ and application 603B in VM $61_N$. VMM 62 is implemented, which is a software layer that virtualizes the available resources of computer system 600 and multiplexes them among the various VMs 61.

Xen-3 62 is a virtual machine monitor for x86 based on a paravirtualization technique, which supports execution of multiple guest operating systems and does not require changes to the application binaries interfaces (ABI), and hence no modifications are required to guest applications. For more information concerning Xen-3, the reader is directed to K. Fraser, S. Hand, R. Neugebauer, I. Pratt, A. Warfield, M. Williamson, "Reconstructing I/O", *Tech. Report, UCAM-CL-TR*-596, August 2004, the disclosure of which is hereby incorporated herein by reference. Xen-3 development is a result of a relatively new I/O virtualization model which adopts a different virtualization approach towards the I/O devices. Device drivers account for the majority of an operating system's code base, and the reuse of the existing driver infrastructure is a pragmatic requirement of any new OS project. The support of sufficiently wide variety of devices is a tremendous development effort for every OS project. New operating systems should benefit from the existing driver code base. One known and useful technique to reuse binaries drivers is via cohosting. In such an architecture, the processor is multiplexed between two collaborating operating systems with one providing device support.

In the initial design of Xen (see B. Dragovic, K. Fraser, S. Hand, T. Harris, A. Ho, I. Pratt, A. Warfield, P. Barham, and R. Neugebauer, "Xen and the Art of Virtualization," *In Proceedings of the ACM Symposium on Operating Systems Principles*, October 2003), Xen itself contained device driver code and provided safe shared virtual device access. The later version of Xen, (Xen-2, see K. Fraser, et al., "Reconstructing I/O", *Tech. Report, UCAM-CL-TR*-596, August 2004) allows unmodified device drivers to be hosted and executed in the privileged management domain: referred to as "Domain0" or "Dom$_0$".

However, there are additional reasons for developing an alternative, more radical approach and architecture for reuse of legacy device drivers. Recent studies show that device drivers are frequently responsible for operating system failures. For example, a study from Stanford university found that the Linux drivers have 3 to 7 times the bug frequency as the rest of the OS. Similarly, product support calls for Windows 2000 showed that device drivers accounted for 27% of crashes compared to 2% for kernel support. Device drivers can be viewed as a type of kernel extensions, added after the fact. Commercial operating systems are typically extended by loading unsafe object code and linking it directly with the kernel.

To reduce the risk of device misbehavior and to address problems of dependability, maintainability, and manageability of I/O devices, Xen-3 uses the complete original OS itself as the compatibility wrapper for a device driver. The original OS effectively becomes an execution container for the driver. Thus, the exemplary system 600, includes isolated driver domains ("IDDs") $64_1$ and $64_2$, which include device drivers 611A and 611B respectively. In this implementation, the device drivers 611A and 611B run unmodified in privileged guest OSs 616A and 616B, respectively.

In the illustrated example, device driver 611A is a device driver supporting access to ethernet ("enet") 614, and device driver 611B is a device driver supporting access to SCSI/IDE 615. Of course, application of the concepts presented herein are not limited to these exemplary device drivers, but rather additional and/or alternative device drivers may be implemented in isolated driver domains in alternative embodiments.

System 600 further includes various shared hardware resources 63. Use of the hardware resources 63 is shared by the various VMs 61, wherein VMM 62 manages access to such shared hardware resources 63 by the various VMs 61. Such shared hardware resources 63 include CPU 612, physical memory 613, network interface such as ethernet ("enet") 614, and Small Computer System Interface (SCSI)/Integrated Drive Electronics (IDE) 615. VMM 62 virtualizes at least some of the shared resources, thus providing a virtual x86 CPU 607 and virtual physical memory 608. In addition to exporting virtualized instances of CPU and memory, VMM 62 exposes a control interface 606 to set how these resources are shared between the running domains 61.

This exemplary Xen virtualization architecture does not completely virtualize the underlying hardware. Instead, it adapts some parts of the hosted guest OSs, such as OSs 604A and 604B, to work with the VMM (or "hypervisor") 62, and thus provides a paravirtualized architecture in which each guest OS is ported to a new target architecture, typically requiring changes in the machine-dependent code. For instance, each guest OS includes virtual device interfaces, such as virtual device interfaces 605A included in guest OS 604A of VM $61_1$ and virtual device interfaces 605B included in guest OS 604B of VM $61_N$, for communicating requests for access to certain shared hardware resources to the VMM 62 and/or through the VMM 62 to the IDDs $64_1$ and $64_2$. The user-level API of each VM is unchanged, allowing the existing binaries of applications, such as software applications 603A and 603B, to work unmodified.

The privileged management domain 60, "Domain 0," is created at boot time and is permitted to use the control interface 606. The control interface 606 provides the ability to create and terminate other domains 61, control the CPU scheduling parameters and resource allocation policies, etc.

The exemplary virtualized system 600 of FIG. 6 is adapted in accordance with one embodiment of the present invention to include communication monitor(s) 106 and CPU utilization monitor 107. As described further herein, communication monitor(s) 106 are operable to determine a weighted amount of communication flowing through the virtualized interfaces between VMs 61 and the IDDs 64; and the CPU utilization monitor 107 is operable to, based on the weighted amount of observed communication, determine a corresponding amount of CPU utilization of the IDDs 64 that is attributable to each of the VMs 61 (i.e., CPU utilization monitor 107 allocates the IDDs' CPU utilization among the various VMs 61 in a fair manner). In the specific example shown, a communication monitor 106 is implemented within net-IDD $64_1$. Thus, in this example, the communication between the virtual device interfaces 605A, 605B of the guest OSs, and the device driver 611A that is implemented in the net-IDD $64_1$ is monitored by communication monitor 106, whereby CPU utilization monitor 107 attributes CPU utilization of the net-IDD $64_1$ to the corresponding VM 61 that caused such CPU utilization. Of course, communication monitors may similarly be implemented in other IDDs for monitoring the amount of communication flowing through the IDD's virtualized back-end interface.

Within the single host system 600 there are two levels of interface to a given resource: 1) at the lower level is the raw physical interface between the IDD (e.g., IDD $64_1$) and the hardware device (resource), and 2) above this is the virtualized interface that is presented to the VMs 61 (e.g., virtualized interfaces 607-608). These two levels of interfaces, while being logically similar, need not be identical. The devices are shared between guest OSs, and there is only one "real" device driver for each device. To make the sharing work, IDD additionally includes a "back-end" driver for the hardware device it hosts. All unprivileged guest domains wishing to share the device include a "front-end" driver. Both of these drivers are virtual, they do not talk directly to hardware but are connected together using device channels. I/O data is transferred to and from each domain via the Xen-3 VMM 62, using shared-memory, asynchronous buffer descriptor rings.

Figure 7:
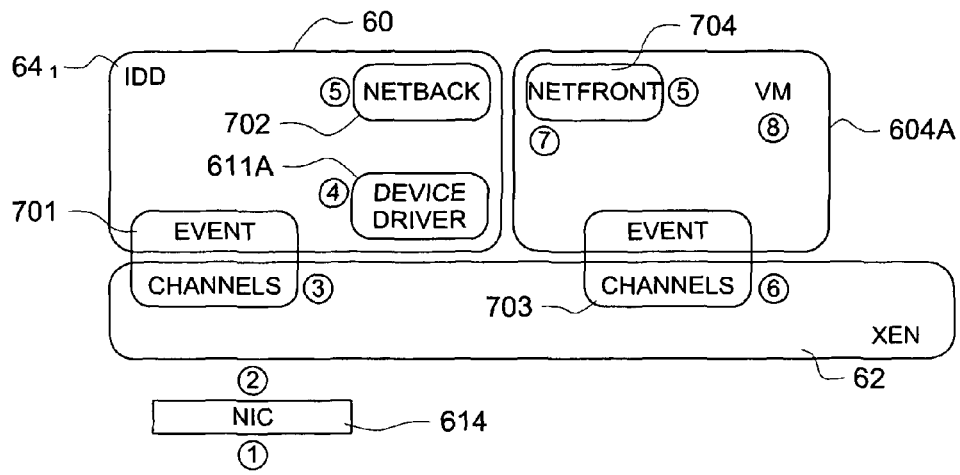
FIG. 7 shows an exemplary I/O processing path in the exemplary virtualization architecture of FIG. 6 according to one embodiment of the present invention.

FIG. 7 shows this I/O architecture of the exemplary Xen-3 embodiment of system 600 in more detail. This example illustrates the I/O processing path in Xen-3 for a networking application executing in a VM 604A for performing networking I/Os (e.g., via ethernet 614). The exemplary steps taken for processing an incoming network packet in this Xen-3 embodiment are numbered 1-8 in FIG. 7, and are described further hereafter. When the hardware (e.g., ethernet network interface 614) receives the packet (indicated by step number 1 in FIG. 7), it raises an interrupt that is trapped by the Xen-3 VMM 62 (indicated by step number 2 in FIG. 7). This additional level of control over the interrupt allows Xen to be more flexible in scheduling CPU across domains that these interrupts are destined for. Once Xen takes the interrupt, it determines which domain is responsible for the device and posts a virtual interrupt to the corresponding network driver domain (e.g., net-IDD $64_1$ in FIG. 6) via the event channel 701 (as indicated by step number 3 in FIG. 7). When the network driver domain is scheduled next, it sees a pending interrupt for it and invokes the appropriate interrupt handler.

The interrupt handler in the network driver domain only serves to remove the packet from the real device driver 611A (as indicated by step number 4 in FIG. 7) and hand it over to the "back-end" driver 702 (as indicated by step number 5 in FIG. 7). In FIG. 7, the "back end" driver 702 is denoted as "netback." Note that no TCP/IP protocol processing is involved in this step 5 (except perhaps the inspection of the IP header).

It is the back-end driver 702's job to forward the packet to the correct "front-end" driver 704, denoted "netfront" in FIG. 7. This forwarding takes place in two stages. In the first stage, the network driver domain (e.g., net-IDD $64_1$ of FIG. 6) posts a "virtual interrupt" to the target guest domain 604A, via event channels 703. When the target guest domain 604A is next scheduled, it will see that it has an interrupt pending. To get the actual data from the network driver domain $64_1$, in this second stage, the guest domain 604A then initiates a "memory page exchange" (as indicated by step number 6 in FIG. 7), for the memory page containing the packet that it will receive from the network driver domain. Note that this operation does not involve copying any packet data. Packets are stored in a shared memory region, and during the second stage above, the ownership of the memory page containing packet data is flipped from the network driver domain $64_1$ to the guest domain 604A. Finally, the packet reaches the "virtual" device driver "netfront" 704 in the guest domain 604A (as indicated by step number 7 in FIG. 7) and is then passed onto higher layers of the TCP/IP stack for further processing (as indicated by step number 8 in FIG. 7). It should be noted that in this exemplary architecture, the netback virtual driver 702 is an ideal observation point because all of the packets (both on the send and receive paths between the network driver domain and the guest domain) should pass through such netback 702. As described further herein, netback 702 may be instrumented to provide detailed measurements on the number of packets processed by such netback 702 (i.e., corresponding IDD) flowing in each of the send and receive directions per each guest domain, as well as other characteristics such as size of the packets, etc. For instance, in one embodiment, a separate packet counter for the receive and send paths per each guest domain is implemented, as well as logic for tracking the number of bytes transferred in each packet.

The above description of the Xen-3 virtualization architecture and communication model of FIGS. 6 and 7 are intended merely as an example of a known virtualization architecture in which embodiments of the present invention may be employed. Thus, the above-described Xen-3 virtualization architecture of FIGS. 6 and 7 are known in the art, and embodiments of a communication monitor(s) 106 and/or CPU utilization monitor 107 may be employed in such virtualization architecture in the manner described further below. Of course, embodiments of the present invention are not limited to application within the above-described exemplary virtualization architecture. Rather, embodiments of the present invention for attributing to corresponding VMs CPU utilization of an IDD (e.g., driver domain $64_1$ or $64_2$) in which a shared resource's device driver resides may be employed in any virtualization architecture. Further, embodiments of the present invention may be employed within a virtualization architecture that uses any communication scheme between the VMs and the IDD for accessing a shared resource.

An exemplary method for accurately partitioning the CPU overhead in a driver domain containing a network device driver (referred to herein as a net-IDD), such as net-IDD $64_1$ of FIG. 6, across corresponding VMs according to one embodiment of the present invention is now described. This exemplary method is based on a per-VM packet counter that reflects a separate number of packets observed for each of the received and send paths between a net-IDD and a particular VM per time unit. As described further, a "weighting" may be assigned to the communication observed between the particular VM and the net-IDD based at least in part on characteristics of the observed packets, such as their size and/or directional flow. Such a per-VM weighted packet counter may be implemented, for example, by communication monitor 106A of FIG. 1 or by communication monitor(s) 106 of FIG. 6. This per-VM weighted packet counter is used (e.g., by CPU utilization monitor 107) to partition the CPU overhead in net-IDD across corresponding VMs. Thus, according to this exemplary embodiment, a light weight method for partitioning the CPU overhead in a net-IDD across corresponding VMs is provided. The exemplary method of this embodiment is based on a per-VM weighted packet counter that reflects:

a) a number of packets that are received and processed by a net-IDD destined for a particular VM per time unit; and b) a number of packets that are processed and sent by net-IDD from a particular VM per time unit.

In certain embodiments, further information detailing the size and/or other characteristics of the packets may also be included. This detailed information per-VM packet counter is used to partition the CPU overhead in the net-IDD across corresponding VMs.

To further describe this exemplary embodiment, let $Dom_0$, $Dom_1, \ldots, Dom_k$ be virtual machines that share the host node, where $Dom_0$ is a privileged management domain (Domain0), such as $Dom_0$ 60 of FIG. 6. Let $Dom_{idle}$ denote a special idle domain that "executes" on the CPU when there are no other runnable domains (i.e. there is no virtual machine that is not blocked and not idle). $Dom_{idle}$ is the analog to the "idle-loop process" executed by an OS when there are no other runnable processes. Further, let $IDD_1, \ldots, IDD_m$ be isolated driver domains (privileged virtual machines) each hosting the driver for different network devices, referred to herein as a net-IDD, such as net-IDD 64$_1$ of FIG. 6.

The traditional monitoring system, that can be found in VMware's and other commercial products, typically measures the amount of CPU allocated by the scheduler for an execution of the particular VM over time. This is a relatively straightforward approach which employs instrumentation of the CPU scheduler in the VMM (or "hypervisor"). Such an instrumentation generally results in the following CPU usage recording (referred to as "equation (1)"): $(Dom_{i_1}, t_1, t_2), (IDD_{i_2}, t_3, t_4), (Dom_{i_3}, t_5, t_6), (Dom_{idle}, t_9, t_{10}), \ldots, (IDD_{i_j}, t_j, t_{j+1}), (Dom_{i_k}, t_{n-1}, t_n)$, where the tuple $(Dom_{i_k}, t_{n-1}, t_n)$ means that virtual machine $Dom_{i_k}$ was using CPU starting at time $t_{n-1}$ and ending at time $t_n$, and similarly $(IDD_{i_j}, t_j, t_{j+1})$, means that isolated driver domain $IDD_{i_j}$ was using CPU starting at time $t_j$ and ending at time $t_{j+1}$.

A more convenient and detailed data structure may be employed in an embodiment of the present invention that provides a similar functionality and keeps such information per each guest domain $Dom_i$ (or $IDD_i$), and indicates the state of the domain. At any point of time, guest domain $Dom_i$ (or $IDD_i$) can be in one of the following three states:

1) execution state: domain $Dom_i$ (or $IDD_i$) is currently using CPU;

2) runnable state: domain $Dom_i$ (or $IDD_i$) is not currently using CPU but is in the run queue and waiting to be scheduled for execution on the CPU; and 3) blocked state: domain $Dom_i$ (or $IDD_i$) is blocked and is not in the run queue (once unblocked it is put back in the run queue).

For each domain $Dom_i$ (or $IDD_i$), a sequence of data describing the timing of domain state changes is collected according to the following ("equation (2)"):

$Dom_i:(t_1^i, t_2^i, \text{execution}), (t_2^i, t_3^i, \text{runnable}), (t_5^i, t_6^i, \text{execution}), (t_6^i, t_7^i, \text{blocked}), (t_7^i, t_8^i, \text{runnable}), \ldots$ By having such a data structure, a share of CPU which was allocated to $Dom_i$ (or $IDD_i$) over time T ($T_1, T_2$) can be easily computed as follows ("equation (3)"):

$$CPU(Dom_i, T) = \frac{\sum_{Ex_j^i \in (T_1, T_2)} CPU(Dom_i, Ex_j^i)}{T_2 - T_1},$$

where execution period $Ex_j^i = (t_j^i, t_{j+1}^i, \text{execution})$ denotes the time period $(t_j^i, t_{j+1}^i)$ with $Dom_i$ being in the execution state.

According to one embodiment, within the monitoring system (e.g., within CPU utilization monitor 107), we use time interval T=100 milliseconds (ms) to aggregate overall CPU usage across different VMs, i.e. $T_2 - T_1 + 100$ ms. Of course, time unit T=100 ms can be set to any other time interval that may be desired in other embodiments. Thus, the CPU usage can be computed by $IDD_1, \ldots, IDD_m, Dom_0, Dom_1, \ldots, Dom_k$ and $Dom_{idle}$ over any time interval.

In addition to computing CPU usage by $IDD_1, \ldots, IDD_m$, this exemplary embodiment uses additional instrumentation (e.g., communication monitor 103A) employed in the netback virtual driver 702 for each $IDD_i$ that provides information on the number of packets processed by $IDD_i$ on behalf of $Dom_l$, where $0 \leq l \leq k$, with the following set of details:

a) a number of packets that are received and processed by $IDD_i$ destined for $Dom_l$ per time unit; and b) a number packets that are processed and sent by $IDD_i$ from $Dom_l$ per time unit.

Thus, for each execution state $Ex_j^i = (t_j^i, t_{j+1}^i, \text{execution})$ of $IDD_i$, there may be a separately determined number of packets that are sent and received between $IDD_i$ and $Dom_l$, as well as a number of transferred bytes in each direction, as measured in the netback virtual driver 702 in $IDD_i$, which may be denoted as:

a) RecvPacks($IDD_i, Dom_l, Ex_j^i$)—a number of packets that are received and processed by destined for $Dom_l$ during the corresponding execution period; and b) SentPacks($IDD_i, Dom_l, Ex_j^i$)—a number of packets that are sent from $Dom_l$ and processed by $IDD_i$ during the corresponding execution period.

By having such a data structure, a number of packets both sent and received between $IDD_i$ and $Dom_l$ over time $T=(T_1, T_2)$ can be easily computed as ("equations (4) and (5)"):

$$RecvPacks(IDD_i, Dom_l, T) = \sum_{Ex_j^i \in (T_1, T_2)} RecvPacks(IDD_i, Dom_l, Ex_j^i) \quad (4)$$

$$SentPacks(IDD_i, Dom_l, T) = \sum_{Ex_j^i \in (T_1, T_2)} SentPacks(IDD_i, Dom_l, Ex_j^i) \quad (5)$$

According to this exemplary embodiment, the overall number of packets both sent and received by $IDD_i$ in each execution state $Ex_j^i$ is tracked for/from all guest domains as follows ("equations (6) and (7)"):

$$RecvPacks(IDD_i, Ex_j^i) = \sum_{1 \leq l}^{l \leq k} Packs(IDD_i, Dom_l, Ex_j^i) \quad (6)$$

$$SentPacks(IDD_i, Ex_j^i) = \sum_{1 \leq l}^{l \leq k} Packs(IDD_i, Dom_l, Ex_j^i) \quad (7)$$

According to one embodiment, the CPU utilization monitor 107 partitions the CPU overhead in the net-IDD across corresponding VMs. To do this, in one embodiment, an understanding of the relationship in CPU consumption between received and sent packets is developed for the target system (e.g., because the received and sent packets exercise different I/O paths in the network device driver) as well as the impact of amount of received/sent bytes on CPU consumption observed in a monitoring time interval. As described further herein, a weighting based on such characteristics of observed communication as packet size and/or directional flow of the packets is developed and used by CPU utilization monitor 107 for partitioning the CPU overhead in net-IDD on behalf of a corresponding domain $Dom_i$.

Figure 8:
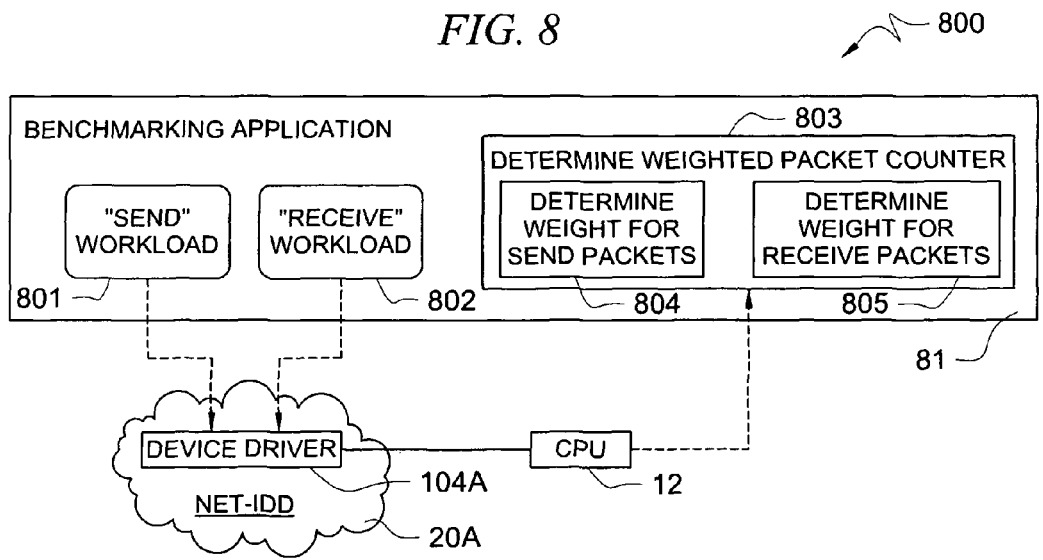
FIG. 8 shows an exemplary system for deriving weights for different characteristics of communication based on observed CPU utilization of a target network driver domain.

An exemplary embodiment for benchmarking a target system to derive the appropriate weighting technique to be applied to observed communication between a VM and a network driver domain in the target system is now described. FIG. 8 shows an exemplary system 800 that comprises a benchmarking application 81 that derives weights for different characteristics of communication based on observed CPU utilization of a target network driver domain. In this example, the target network driver domain is network driver domain 20A of FIG. 1, which includes network device driver 104A. In certain embodiments, the benchmarking application 81 may interact with the actual target network driver domain, or the benchmarking application 81 may interact with a simulation of the target network driver domain (or another comparable network driver domain) to derive the weights for different communication characteristics in the manner described herein.

In the illustrated example, benchmarking application 81 comprises a "send" workload 801 and a "receive" workload 802. Send workload 801 comprises a number of communications (e.g., 100,000 packets) which are directed from a communication network (e.g., from an independent client machine) to a VM, such as VM $10_2$ of FIG. 1. The send workload 801 may comprise a number of such communications of differing packet sizes and/or of different communication rates. Receive workload 802 comprises a number of communications (e.g., 100,000 packets) which are directed from a VM, such as VM $10_2$ of FIG. 1, to a communication network (e.g., to an independent client machine). The receive workload 802 may comprise a number of such communications of differing packet sizes and/or of different communication rates.

The send and receive workloads are directed to device driver 104A, and benchmarking application 81 monitors the CPU utilization of the device driver 104A in processing the communications having various different characteristics. Further, in operational block 803, the benchmarking application 81 derives the weighted packet counter to be employed for the target network driver domain. That is, the relative weights for different characteristics of communication are derived depending on the determined relative impact of such characteristic on the network driver domain's CPU utilization. Thus, for instance, a relative weight may be determined in block 804 for send packets (e.g., based on the observed impact on the CPU utilization of device driver 104A in processing send workload 801), and a relative weight may be determined in block 805 for receive packets (e.g., based on the observed impact on the CPU utilization of device driver 104A in processing receive workload 802). The derived weights may then be employed on a communication monitor, such as communication monitor 106A of FIG. 1, for observing communication between VM(s) and the target network driver domain 20A and determining a corresponding weight for the communication.

An exemplary application of an embodiment of the present invention for deriving weights is now described to provide an illustrative case study. In this exemplary application of an embodiment, we ran the well-known netperf benchmark (see http://netperf.org) to send/receive 1,000,000 packets between an independent client machine and arbitrary $Dom_i$ (via specified network device in $IDD_i$), where packets were configured to be of different sizes as follows:

a) test 1: 100 bytes;
b) test 2: 500 bytes;
c) test 3: 1000 bytes; and
d) test 4: 1400 bytes.

Figure 9:
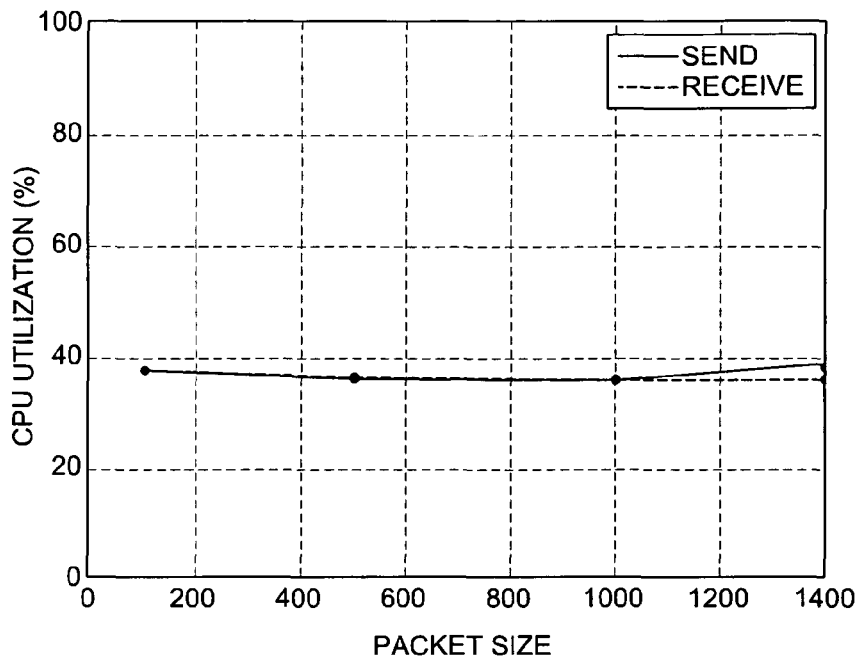
FIG. 9 shows a graph illustrating performance results for an exemplary case study, showing that CPU consumption of a network driver domain does not depend on packet size in the case study.

Our experimental results for different networking devices and 8 netperf tests (tests performed with the above-identified 4 different packet sizes and using 2 different directions) show that CPU consumption in $IDD_i$ for the exemplary target system in this case study does not depend on a packet size as shown in the graph of FIG. 9.

Additionally, in this exemplary application, we designed a set of simple networking benchmarks for computing relative weights in CPU consumption between received and sent I/O paths in network device drivers as follows. Let the packet size be fixed. Using the well-known UDP protocol and varying the rate Rate/sec at which packets are issued (e.g. 1000 packets per second, 2000 packets per second, 3000 packets per second, 4000 packets per second), in this exemplary application we exercised the following two benchmarks:

1) Send Benchmark: an independent client machine sends 100,000 packets destined to $Dom_i$ at rate Rate/sec; and
2) Receive Benchmark: $Dom_i$ sends 100,000 packets destined to an independent client machine at rate Rate/sec.

Typically, these benchmarks should be tuned for sustainable bandwidth available between the client and $Dom_i$, i.e. it may be desirable to exercise these benchmarks for the rates at which no packet drops occur, and choose a set of rates that can be sustained in both directions. For example, if bandwidth Rate-Max in packets/sec is a common rate that can be sustained by both the Send Benchmark and Receive Benchmark, then we may pick additional four varying rates for these benchmarks in such a way that they cover rates smaller than Rate-Max as follows:

a) $Rate_1=0.2\times Rate\text{-}Max$;
b) $Rate_2=0.4\times Rate\text{-}Max$;
c) $Rate_3=0.6\times Rate\text{-}Max$;
d) $Rate_4=0\text{-}8\times Rate\text{-}Max$; and
e) $Rate_5=Rate\text{-}Max$.

In this exemplary application, we measured an average CPU consumption (CPU Utilization) by $IDD_i$ for the Send Benchmark and Receive Benchmark over time and across different issue rates.

Figure 10:
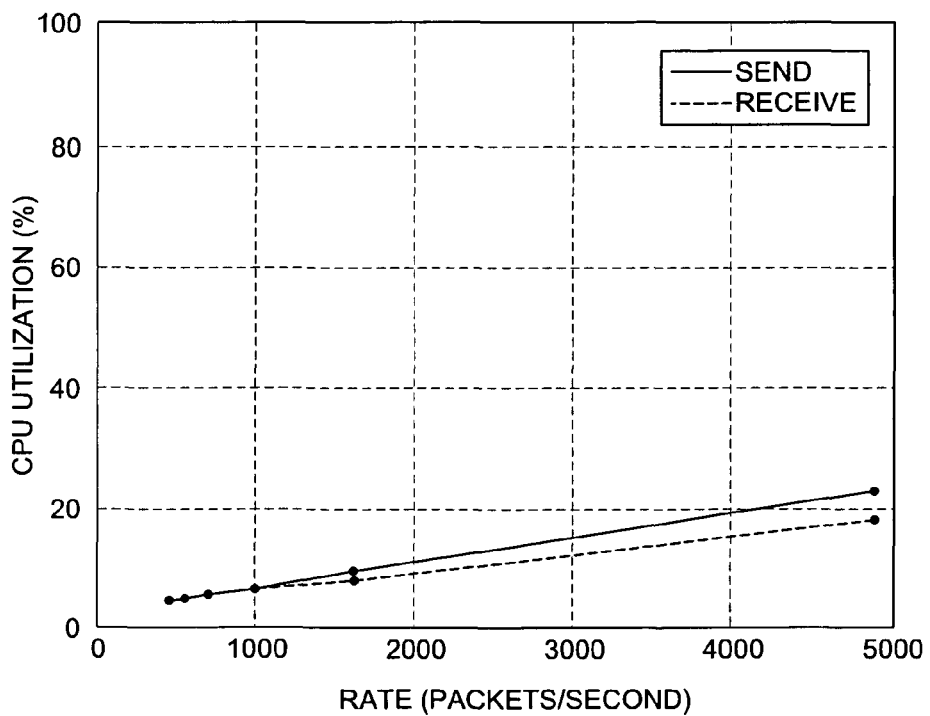
FIG. 10 shows a graph illustrating performance results for send and receive benchmarks in an exemplary case study.

Our experimental results in this exemplary case study for different networking devices show that ratio of CPU consumption in Send versus Receive paths is consistent and practically does not depend on varying packet rates, as shown in FIG. 10. For 1 Gbit Ethernet card in this exemplary case study, we measured that the ratio of CPU consumption in $IDD_i$ across Send versus Receive paths is on average 1.1 (deviation 0.007).

For deriving the corresponding weights for receive and send in this exemplary application, let $CPU(IDD_i, Recv, Rate_r)$ denote CPU utilization of $IDD_i$ for the Receive Benchmark at rate $Rate_r$. Further, let $CPU(IDD_i, Send, Rate_r)$ denote CPU utilization of $IDD_i$ for the Send Benchmark at rate $Rate_r$. According to this exemplary embodiment, we define SendRecvRatio($IDD_i$) in the following way ("equation (8)"):

$$SendRecvRatio(IDD_i) = \frac{\sum_{1 \le r \le 5} \frac{CPU(IDD_i, Send, Rate_r)}{CPU(IDD_i, Recv, Rate_r)}}{5}.$$

Now, the weighted packet counter in the net-IDD for domain $Dom_l$ can be computed as follows ("equation (9)"):

WeightedPacks($IDD_i$,$Dom_l$,T)=Send RecvRatio ($IDD_i$)×SentPacks($IDD_i$,$Dom_l$,T)+RecvPacks ($IDD_i$,$Dom_l$,T).

Also, the overall weighted packet counter in net-IDD across all domains can be computed as follows ("equation (10)"):

WeightedPacks($IDD_i$,T)=Send RecvRatio($IDD_i$)× SentPack($IDD_i$,T)+RecvPack($IDD_i$,T).

Now, a share of CPU time used by $IDD_i$ for processing the I/O-related activities on behalf of $Dom_l$ over time $T=(T_1, T_2)$ can be computed as ("equation (11)"):

$$CPU(IDD_i, Dom_l, T) = CPU(IDD_i, T) \times \frac{WeightedPacks(IDD_i, Dom_l, T)}{WeightedPacks(IDD_i, T)}$$

As we mentioned before, within the monitoring system in this exemplary embodiment, a time interval of 100 ms is used to aggregate overall CPU usage across different virtual machines, but this time unit T=100 ms can be set to a different time interval if so desired.

The above exemplary data structures and equations may be employed by, for example, a communication monitor (e.g., communication monitor 106A of FIG. 1) and/or a CPU utilization monitor (e.g., CPU utilization monitor 107 of FIG. 1). When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information. In certain embodiments, a CPU may execute the various logical instructions according to embodiments of the present invention. For example, a CPU may execute machine-level instructions according to the exemplary operational flows described above in conjunction with FIGS. 2-4 and 11 and/or according to the above-described data structures and equations.

It shall be appreciated that the present invention is not limited to the architecture of the system on embodiments thereof may be implemented. For example, any suitable processor-based device may be utilized for implementing the above-described operations, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

What is claimed is:

1. A method comprising:
observing communication through a virtualized interface between at least one virtual machine (VM) and a driver domain; and
determining for each of the at least one VM, based on the observed communication through the virtualized interface, a weighted amount of communication between the VM and the driver domain, wherein the weighted amount is based at least in part on:
deriving a first weighting for communication flowing in a first direction, wherein the first weighting is based on the evaluated amount of CPU utilization of the target network driver domain in processing communication flowing in only the first direction; and
deriving a second weighting for communication flowing in a second direction, wherein the second weighting is based on the evaluated amount of CPU utilization of the target network driver domain in processing communication flowing in only the second direction.

2. The method of claim 1 wherein the weighted amount is based at least in part on size of communication units observed.

3. The method of claim 1, wherein the weighted amount of communication is determined at least in part as a function of the weighting of the first and second directions of the observed communication and an amount of communication observed having the first and second directions.

4. The method of claim 1 further comprising:
determining for each of the at least one VM, based on the determined weighted amount of communication between the VM and the driver domain, CPU utilization of the driver domain attributable to the VM.

5. The method of claim 1 wherein the driver domain comprises an isolated driver domain (IDD) that comprises a device driver for network communication.

6. A method comprising:
evaluating, by a benchmarking application, Central Processing Unit (CPU) utilization of a target network driver domain in processing communications having different characteristics;
deriving, by the benchmarking application, corresponding weighting for the different communication characteristics, wherein the weighting is based at least in part on:
deriving a first weighting for communication flowing in a first direction, wherein the first weighting is based on the evaluated amount of CPU utilization of the target network driver domain in processing communication flowing in only the first direction; and
deriving a second weighting for communication flowing in a second direction, wherein the second weighting is based on the evaluated amount of CPU utilization of the target network driver domain in processing communication flowing in only the second direction; and
employing the derived weighting for the different communication characteristics within a communication monitor that observes communication between virtual machines and the target network driver domain.

7. The method of claim 6 wherein the deriving further comprises:
deriving said weighting for each of the different communication characteristics based on the respective amount of CPU utilization of the target network driver domain in processing each of the different communication characteristics.

8. A system comprising:
Central Processing Unit (CPU);
Virtual Machines (VMs);
at least one isolated network driver domain (net-IDD) in which a device driver for communicatively accessing a communication network resides;
a virtualized back-end interface for the net-IDD through which network packets between the VMs and the device driver flow; and a CPU utilization monitor operable to determine, based at least in part on a weighted amount of communication observed through the virtualized back-end interface between the netIDD and a given VM, an amount of CPU utilization of the net-IDD that is attributable to the given VM, wherein the weighted amount is based at least in part on:
   deriving a first weighting for communication flowing in a first direction, wherein the first weighting is based on the evaluated amount of CPU utilization of the target network driver domain in processing communication flowing in only the first direction; and
   deriving a second weighting for communication flowing in a second direction, wherein the second weighting is based on the evaluated amount of CPU utilization of the target network driver domain in processing communication flowing in only the second direction.

9. The system of claim 8 wherein the weighted amount of communication is further based in part on: a) a number of network packets communicated through the virtualized back-end interface between the net-IDD and the given VM, and b) at least one characteristic of the network packets.

10. The system of claim 9 wherein the at least one characteristic comprises size of network packets.

11. The system of claim 10 wherein different weightings are assigned to network packets of different sizes.

12. The system of claim 8 further comprising:
   a communication monitor that observes the network packets communicated through the virtualized back-end interface between the net-IDD and the given VM, derives the weighted amount of communication, and communicates the weighted amount of communication to the CPU utilization monitor.

* * * * *

UNITED STATES PATENT AND TRADEMARK OFFICE
CERTIFICATE OF CORRECTION

PATENT NO. : 8,214,838 B2
APPLICATION NO. : 11/493492
DATED : July 3, 2012
INVENTOR(S) : Ludmila Cherkasova et al.

It is certified that error appears in the above-identified patent and that said Letters Patent is hereby corrected as shown below:

In the Claims:

In column 25, line 2, in Claim 8, delete "netIDD" and insert -- net-IDD --, therefor.

Signed and Sealed this
Seventh Day of May, 2013

Teresa Stanek Rea
*Acting Director of the United States Patent and Trademark Office*